A. J. ERICSSON.
CENTRIFUGAL MACHINE.
APPLICATION FILED OCT. 2, 1906.
900,089.
Patented Oct. 6, 1908.
2 SHEETS—SHEET 1.
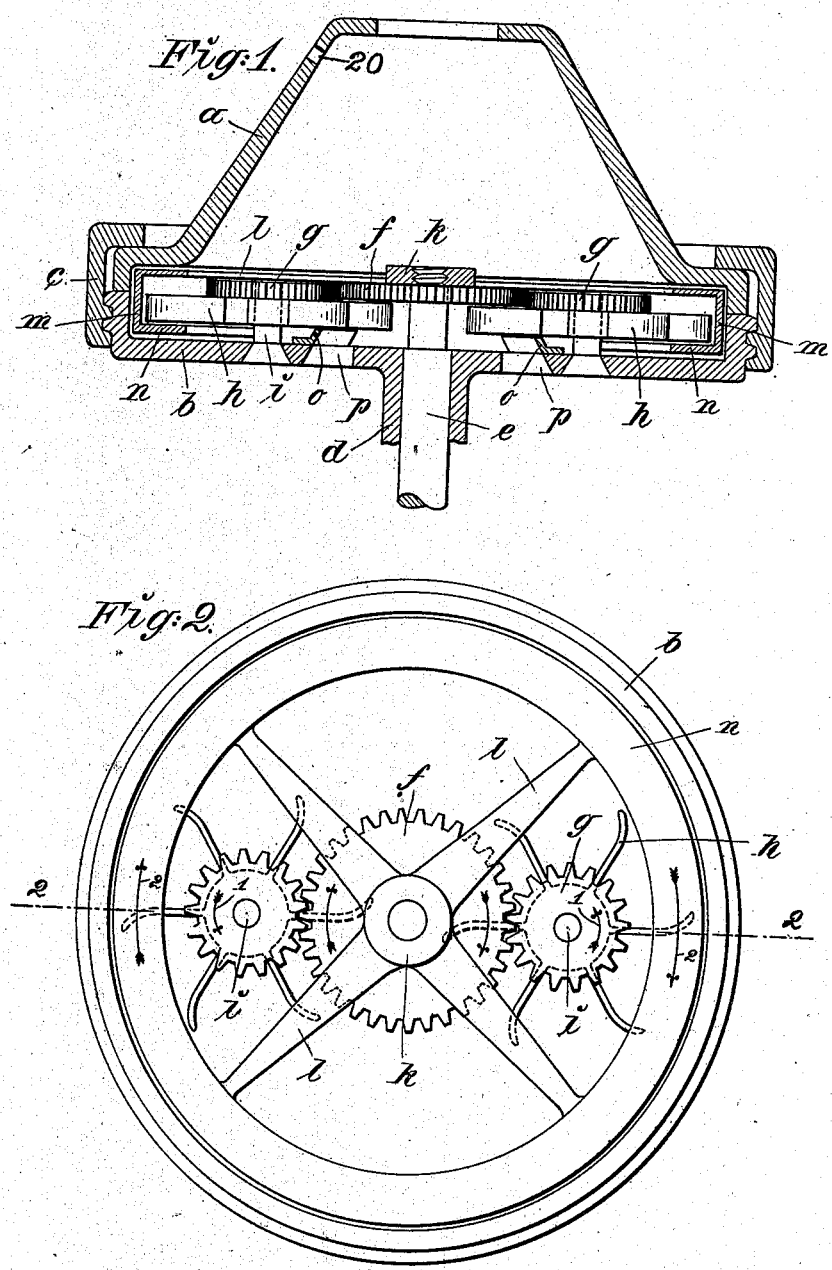

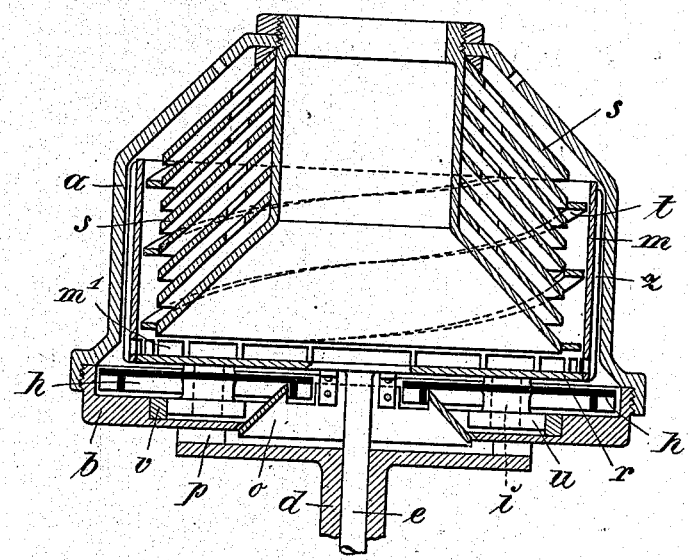
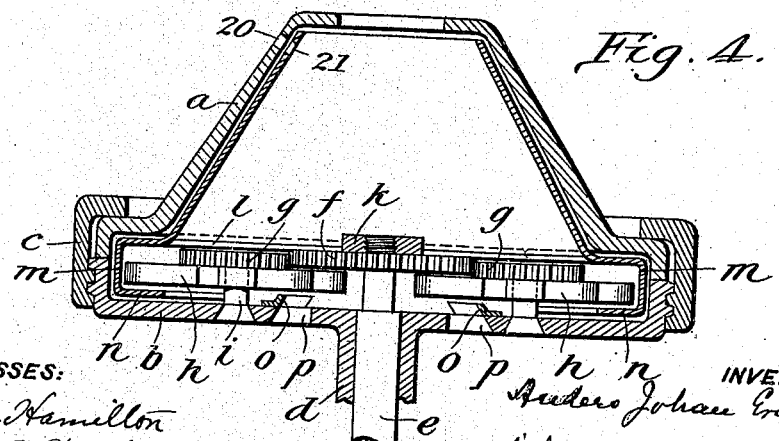

UNITED STATES PATENT OFFICE.

ANDERS JOHAN ERICSSON, OF STOCKHOLM, SWEDEN, ASSIGNOR TO AKTIEBOLAGET SEPARATOR, OF STOCKHOLM, SWEDEN.

CENTRIFUGAL MACHINE.

No. 900,089.   Specification of Letters Patent.   Patented Oct. 6, 1908.

Application filed October 2, 1906. Serial No. 337,063.

*To all whom it may concern:*

Be it known that I, ANDERS JOHAN ERICSSON, a subject of the King of Sweden, residing at 8 Fleminggatan, Stockholm, Sweden, have invented certain new and useful Improvements in Centrifugal Machines for Separating Solids from Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in centrifugal machines for separating solids from liquids of that class in which the solids, stratified along the inner wall of the bowl or drum, are carried down to scraper-wheels or other devices in the bottom of the bowl, whereupon they are brought outside the bowl by means of said devices.

The object of the present invention is attained by causing the solids to be caught in a separate bowl, movably arranged within the centrifugal bowl proper. The said inner bowl is given either a conical shape, so that no scrapers are required for conveying the solids to the bottom of the bowl or a cylindrical shape, in which case inclined scrapers, immovably arranged relatively to the centrifugal bowl and to the liquid therein, act against the said inner bowl. When the latter is rotated, the solids stratified thereon, will also rotate and a relative motion is created between the solids and the scrapers. The solids will then be scraped down along the wall of the inner bowl and when arriving at the lower edge thereof, they are caught up by scraper-wheels or like transporting device in the bowl. Said scraper-wheels or the like may be arranged in the bottom of the centrifugal bowl proper and then the solids and the scraper wheels or the like will move relatively to each other.

The invention is illustrated on the annexed drawings, Figures 1 and 2 showing one form of the invention, Fig. 1 being a section on the line 2—2 of Fig. 2 and Fig. 2 is a plan view with the cover removed. Fig. 3 is a section of a modified form. Fig. 4 is a view similar to Fig. 3 showing inner bowl $m$ extending to top of main bowl $a$, said inner bowl $m$ having the discharge outlet 21 in line with the discharge outlet 20 of bowl $a$.

In Figs. 1 and 2 $a$ is the bowl having the liquid discharge opening 20 and $b$ the bottom thereof, secured together by means of a threaded ring $c$. The bowl is of conical shape so that the solids will slide down to the bottom thereof. Through the hollow bowl shaft $d$ another solid shaft $e$ passes, said latter shaft being provided at its upper part with a toothed wheel $f$ meshing with the other toothed wheels $g$, which together with the scraper-wheels $h$ are rotatable on the shafts $i$ secured to the bottom of the bowl. To the top of the shaft $e$ a hub $k$ is secured, which supports the inner bowl $m$ by means of arms $l$. Said bowl $m$ may extend up to the top of the main bowl $a$ (see Fig. 4) but this is not necessary when the bowl is of conical shape.

The inner bowl is provided with flanges $n$, so that an annular space is formed in which the solids may accumulate. The scraper-wheels $h$ extend almost to the inner wall of the said bowl $m$.

The operation is as follows: The two shafts $d$ and $e$ are caused to rotate at different speeds by any suitable means, not shown on the drawing, and by means of the toothed wheels $f$ and $g$ the scraper-wheels $h$ are rotated on the shafts $i$ in the direction indicated by the arrows 1 and further the bowl $m$ will rotate relatively to the bowl $a$ as indicated by the arrows 2. The solids will slide along the conical wall of the bowl $a$ or the upper part of the bowl $m$ are caught in the latter, that is to say, its lower part, and are conveyed in a circumferential direction to the scraper-wheels $h$, which rotate on their shafts in the opposite direction. The scrapers carry the solids through the layer of liquid towards the center of the bowl, and owing to the centrifugal force acting on the solids the latter will then slide along the scrapers, and are caught by the inclined shields $o$, which direct them through the apertures $p$ in the bottom of the bowl, through which they escape to the exterior.

If the bowl is of cylindrical shape instead of conical and is provided with a liner, the form shown in Fig. 3 is used. In this figure, however, the lower part of the inner bowl is omitted, since in this construction the shafts of the scraper-wheels rotate around the axis of the bowl, imparting to the scraper-wheels a planetary motion in the bowl. Owing to this planetary motion the scrapers will travel along the periphery of the bowl and no means will then be necessary for conveying the solids to the scrapers. It is, however, evident, that the same construction of the scraper-wheels and the lower parts of the bowl may be used in this combination as in Figs. 1 and 2.

In Fig. 3, $a$ is the bowl, $b$ the bottom thereof, $d$ the outer and $e$ the interior shafts. To the top of the shaft $e$ a disk $r$ is secured, on which the inner bowl $m$ is mounted. Said inner bowl is located between the bowl $a$ and the liner $s$ and is provided at its lower edge with holes $m'$ for passage of the solids. On the liner inclined scrapers $t$ are arranged. To said disk $r$ are secured the shafts $i$ on which the scraper-wheels $h$ are mounted, said scraper-wheels being secured to rolls or friction-wheels $u$, which engage the ring $v$, secured to the bottom of the bowl.

If the solids should accumulate in the space between the bowls $a$ and $m$ they will be scraped down by means of the inclined or helical scrapers $z$ arranged on the exterior of the bowl $m$.

The operation is as follows: When the shafts $d$ and $e$ rotate relative to each other, the bowl $m$ will rotate between the bowl $a$ and the liner $s$, whereupon the solids, which have become stratified on the said bowl, will be scraped down by the inclined scrapers $t$, moving relatively thereto, and will then pass through the holes $m'$ to the bottom of the bowl. On the other hand the friction wheels $u$ will roll upon the ring $v$ being forced against same by the centrifugal force. The scraper-wheels $h$ will then rotate upon the shafts $i$ and when said shafts have a rotary motion relatively to the bowl, the scraper-wheels will be given a planetary motion within the bowl, and catch the solids, scraped down to the bottom, along the whole periphery of the bowl and convey them to the center thereof where they slide from the scrapers to the shields $o$ which direct them to the holes $p$ leading to the exterior of the bowl. If no liner is used, the scrapers may be secured to a central perforated pipe, drum or the like.

Having now particularly described and ascertained the nature of the said invention and in what manner the same is to be performed, I declare that what I claim is:—

1. In centrifugal machines for separating solids from liquids, in combination, an outer bowl rotatably mounted and having an imperforate periphery, a second bowl, having an imperforate periphery above the lower end, mounted within the first mentioned bowl and concentric therewith, and adapted to rotate at a speed different from that of the first mentioned bowl, there being an outlet for the solids through the lower portion of the inner bowl and a corresponding outlet through the lower portion of the outer bowl.

2. In centrifugal machines for separating solids from liquids, in combination, an outer bowl rotatably mounted and having an imperforate periphery, a second bowl, having an imperforate periphery above the lower end, rotatably mounted within the first mentioned bowl and concentric therewith.

3. In centrifugal machines for separating solids from liquids, in combination, an outer bowl rotatably mounted and having an imperforate periphery, a second bowl, having an imperforate periphery above the lower end rotatably mounted within the first mentioned bowl, and concentric therewith, means to bring the solids collected on the periphery of the second bowl to the lower portion thereof, there being an outlet for the solids through the lower portion of said inner bowl, and scrapers to convey said solids toward the center, there being an outlet for the solids through the outer bowl.

4. In centrifugal machines for separating solids from liquids, in combination, an outer bowl rotatably mounted and having an imperforate periphery, a second bowl, having an imperforate periphery above the lower end, rotatably mounted within the first bowl and concentric therewith, means to bring the solids collected on the periphery of the inner bowl to the bottom thereof, there being an outlet through the inner bowl at the lower portion thereof, and scrapers at the bottom, surrounded by said second bowl, to convey said solids toward the center, to which said scrapers are adapted to convey the solids, there being an outlet through the outer bowl.

5. In centrifugal machines for separating solids from liquids, in combination, an outer bowl rotatably mounted and having an imperforate periphery, a second bowl, having an imperforate periphery above the lower end, rotatably mounted within the first bowl and concentric therewith, and scrapers between the two bowls and revolving with the inner bowl.

6. In centrifugal machines for separating solids from liquids, in combination, an outer bowl rotatably mounted and having an imperforate periphery, and provided with a liner, a second bowl, having an imperforate periphery above the lower end, rotatably mounted within the first bowl and concentric therewith, and inclined scrapers secured to said liner and acting along the inner wall of said inner bowl.

7. In centrifugal machines for separating solids from liquids, in combination, an outer bowl rotatably mounted and having an imperforate periphery, a second bowl, having an imperforate periphery above the lower end, rotatably mounted within the first bowl and concentric therewith, and scrapers between the walls of the two bowls.

8. In centrifugal machines for separating solids from liquids, in combination, an outer bowl rotatably mounted and having an imperforate periphery, a second bowl, having an imperforate periphery above the lower end, rotatably mounted within the first bowl and concentric therewith, said second bowl having orifices for the discharge of the solids at the lower portion of said bowl, and inclined scrapers operating along the inner wall of said inner bowl to carry the solids to said orifices.

9. In centrifugal machines for separating solids from liquids, in combination, an outer bowl rotatably mounted and having an imperforate periphery, and provided with a central device adapted to allow the liquid to pass, a second bowl, having an imperforate periphery above the lower end, rotatably mounted within the first bowl and concentric therewith, and an inclined scraper connected to said central device.

In testimony, that I claim the foregoing as my invention, I have signed my name in presence of two subscribing witnesses.

ANDERS JOHAN ERICSSON.

Witnesses:
  CARL FRIBERG,
  HARRY ALBIHN.